United States Patent Office 3,356,760
Patented Dec. 5, 1967

3,356,760
RESINOUS MATERIAL CONTAINING AN AROMATIC POLYIMIDE, A FLUOROCARBON POLYMER AND A POLYAMIDE
Attila Matray, Buffalo, N.Y., assignor to E. I. du Pont de Nemours and Company, Wilmington, Del., a corporation of Delaware
No Drawing. Continuation of application Ser. No. 368,361, May 18, 1964. This application Mar. 16, 1967, Ser. No. 623,773
13 Claims. (Cl. 260—857)

ABSTRACT OF THE DISCLOSURE

A three component composition containing:
(1). 60–87.5 parts by weight of an aromatic polyamide-acid.
(2) 20–40 parts by weight of a halocarbon resin having the recurring unit —$CF_2$—$CF_2$— or —$CF_2$—CFCL— and
(3) 1–15 parts by weight of a polyamide.
In an example the polyamide-acid is prepared from pyromellitic dianhydride, and 4,4'-diaminodiphenyl ether, the halocarbon resin is tetrafluoroethylene, and the polyamide is poly(m-phenylene isophthalamide.)

---

This application is a continuation of application Ser. No. 368,361, filed May 18, 1964, and now abandoned.

This invention relates to bearing materials of excellent resistance to wear and thermal degradation.

More particularly, this invention is directed to novel compositions of polyimides containing as essential components a significant amount of a halocarbon resin and a small amount of a polyamide resin; to the preparation of such polyimide compositions; and to novel polyamide-acid intermediate compositions for said polyimides.

According to the present invention, a novel three-component bearing material is provided having outstanding wear resistance and particularly good frictional properties, including especially a low non-lubricated static coefficient of friction. This material also has excellent resistance to thermal degradation at high temperatures (over 200° C.) as well as low temperatures. Furthermore, the material has good creep resistance over a broad temperature range under various kinds of stresses.

The three-component compositions of this invention comprise:
(1) 55–80 parts by weight of an aromatic polyimide (or 60–87.5 parts by weight of an aromatic polyamide-acid).
(2) 20–40 parts by weight of a halocarbon resin having the recurring unit $$-CF_2-CF_2- \text{ or } -CF_2-CF- \atop Cl$$

and
(3) As the third essential component, 1–15 and preferably 2–10 parts by weight of a polyamide defined more fully below.

Specifically, the polyimides are of organic diamines and tetracarboxylic acid dianhydrides, the organic diamines having the formula $H_2N$—R'—$NH_2$ where R' is a divalent aromatic radical (arylene), preferably one of the following groups: phenylene, naphthylene, biphenylene, anthrylene, furylene, benzfurylene, and (1) 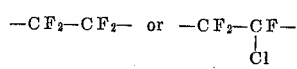

where $R^2$ is alkylene of 1–3 carbon atoms, oxygen, sulfur, or one of the following:

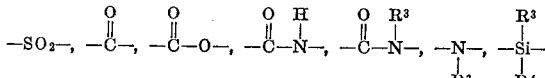

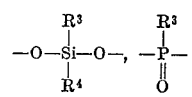

and

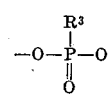

wherein $R^3$ and $R^4$ are alkyl or aryl, and substituted groups thereof.

Among the diamines suitable for use in the present invention are:

meta-phenylene diamine,
paraphenylene diamine,
2,2-bis(4-aminophenyl)propane,
4,4'-diaminodiphenyl methane,
4,4'-diaminodiphenyl sulfide,
4,4'-diaminodiphenyl sulfone,
3,3'-diaminodiphenyl sulfone,
4,4'-diaminodiphenyl ether,
2,6-diaminopyridine,
bis(4-aminophenyl)diethyl silane,
bis(4-aminophenyl)diphenyl silane,
benzidine,
3,3'-dichlorobenzidine,
3,3'-dimethoxybenzidine,
bis(4-aminophenyl)ethyl phosphine oxide,
4,4'-diaminobenzophenone,
bis(4-aminophenyl)phenylphosphine oxide,
bis(4-aminophenyl)-N-butylamine,
bis(4-aminophenyl)-N-methylamine,
1,5-diaminonaphthalene,
3,3'-dimethyl-4,4'-diaminobiphenyl,
N-(3-aminophenyl)-4-aminobenzamide,
4-aminophenyl-3-aminobenzoate,
2,4-bis(beta-amino-t-butyl)toluene,
bis(p-beta-amino-t-butylphenyl)ether,
p-bis(2-methyl-4-aminopentyl)benzene,
p-bis(1,1-dimethyl-5-aminopentyl)benzene,
m-xylylene diamine,
p-xylylene diamine,
bis(4-aminophenyl)-N-phenylamine, and mixtures thereof.

The tetracarboxylic acid dianhydrides are characterized by the following formula:

(2) 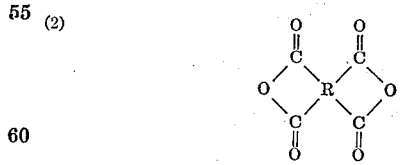

where R is a tetravalent organic radical, e.g., aromatic, aliphatic, cycloaliphatic, heterocyclic, combination of aromatic and aliphatic, or substituted groups thereof. Illustrative are the following:

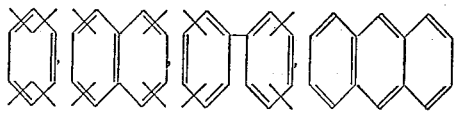

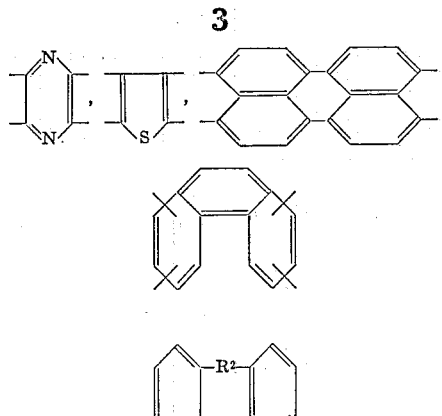

and

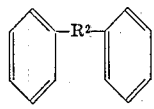

wherein R² has the same meaning as above.

In these dianhydrides every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

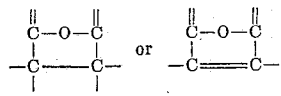

Illustrations of dianhydrides suitable for use in the present invention include:

pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl) propane dianhydride,
bis(3,4-dicarboxyphenyl) sulfone dianhydride,
3,4,9,10-perylene tetracarboxylic dianhydride,
bis(3,4-dicarboxyphenyl) ether dianhydride,
ethylene tatracarboxylic dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
benzene-1,2,3,4-tetracarboxylic dianhydride,
1,2,3,4-butane tetracarboxylic dianhydride,
thiophene-2,3,4,5-tetracarboxylic dianhydride,
3,4,3',4'-benzophenone tetracarboxylic dianhydride,
2,3,2',3'-benzophenone tetracarboxylic dianhydride,
2,3,3',4'-benzophenone tetracarboxylic dianhydride, etc.

The use of the organic diamines and tetracarboxylic acid dianhydrides in the preparation of novel useful compositions and structures according to this invention will be described more fully below.

The second essential component according to this invention is a halocarbon resin having the recurring unit:

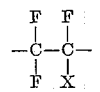

where X is fluorine or chlorine. Representative of such halocarbon resins are the homopolymers of tetrafluoroethylene and chlorotrifluoroethylene, and also copolymers of tetrafluoroethylene with hexafluoropropylene.

In a particularly preferred embodiment, the halocarbon resin having the recurring unit shown above is a modified polymer of the type known as a telomer. These telomers are preferred because of the outstanding wear properties plus the overall combination of desirable bearing material characteristics of the three-component products prepared utilizing the telomers.

The telomers are wax-like materials which are the reaction products of a halocarbon having the unit shown above, such as tetrafluoroethylene, and an active telogen. The term "active telogen" is used, as it is used in the art, to describe a telogen which, on reaction with tetrafluoroethylene without solvent, produces low molecular weight products whose molecules contain predominantly one or two tetrafluoroethylene units per active telogen unit. Such telomers are known in the art and are described, for example, in Brady U.S. Patent No. 3,067,262, issued Dec. 4, 1962, the entire disclosure of which is incorporated herein by reference.

Active telogens are of course also well known in the art. Representative active telogens are tertiary hydrocarbons such as isobutane, isopentane, methylcyclopropane, 2,3-dimethylbutane, methylcyclohexane, etc.; aliphatic ethers with alpha hydrogen atoms such as tetrahydrofuran, diethyl ether, dioxane, 1,2-dimethoxyethane, diethylene glycol dimethyl ether, etc.; tertiary aliphatic amines such as trimethylamine, triethylamine, triethylenediamine, etc.; aliphatic alcohols containing an alpha hydrogen such as methanol, ethanol, isopropanol, sec-butyl alcohol, cyclohexanol, etc.; bivalent aliphatic sulfur compounds such as ethyl mercaptan, dimethyldisulfide, diethyldisulfide, dipropyldisulfide, etc.; aliphatic carbonyl compounds such as aldehydes, ketones, diketones, acids, esters, etc. containing an alpha hydrogen atom such as acetaldehyde, acetone, methyl ethyl ketone, 2,4-pentanedione, ethyl acetoacetate, isobutyric acid, gamma-valerolactone, etc.; dialkyl phosphites such as dimethyl phosphite, diethyl phosphite, etc.; dialkylamides such as N,N-dimethylformamide, etc.; chloroform, carbon tetrachloride, trichlorotrifluoroethane, and the like.

The third essential component according to this invention is a polyamide of one of the following two classes:

Class 1.—Linear condensation polyamides of an aliphatic dibasic acid of 4–18 carbon atoms, such as succinic, glutaric, adipic, pimelic, suberic, azelaic, sebacic, 1,12-dodecanedioic, hexadecamethylene dicarboxylic, and the like, and an alkylene diamine of 2–10 carbon atoms, such as ethylene diamine, trimethylene diamine, propylene diamine, tetramethylene diamine, pentamethylene diamine, hexamethylene diamine, 1,8-diaminooctane, 1,9-diaminononane, 1,10-diaminodecane, and the like.

These linear condensation polyamides of Class 1 are known in the art and are described, for example, in Carothers U.S. Patent No. 2,071,250, issued Feb. 16, 1937, the entire disclosure of which is hereby incorporated by reference.

*Class 2.*—Aromatic polyamides characterized predominantly by the recurring structural unit

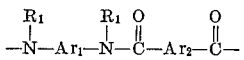

wherein $R_1$ is hydrogen or alkyl of 1–4 carbons, and wherein $Ar_1$ and $Ar_2$ can be the same or different and can be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization, the term "lower" referring to less than five carbon atoms.

These aromatic polyamides of Class 2 are also known in the art and they and their preparation are described, for example, in Hill, Kwolek and Sweeny, U.S. Patent No. 3,094,511, the entire disclosure of which is hereby incorporated by reference. The scope of Class 2 of useful aromatic polyamides is intended to be identical with the scope of the disclosure of that patent and its contents form a part of the present disclosure to the art. The descriptions of Hill et al., column 1, line 48, to column 5, line 20, is particularly incorporated.

As stated therein, the aromatic polyamides are reaction products of an aromatic diacid chloride with an aromatic diamine, the aromatic diacid chloride being of the formula

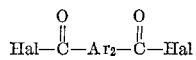

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Diacid chlorides which may be utilized to prepare the polyamides include isophthaloyl chloride and lower alkyl isophthaloyl chlorides, such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. It is not necessary that all of the alkyl substituent groups be the same because compounds such as 2-methyl-4-ethyl isophthaloyl chloride and 2-methyl-4-ethyl-5-propyl isophthaloyl chloride may be utilized, the total number of carbon atoms in all the substituent groups (non-polyamide-forming groups) attached to the aromatic ring in the latter two compounds being 3 and 6, respectively. In place of an alkyl group, the aromatic ring in isophthaloyl chloride may be substituted with one or more lower alkoxy groups such as, for example, methoxy-, ethoxy-, propoxy-, butoxy-, etc., isophthaloyl chlorides. As with alkyl-substituted isophthaloyl chlorides it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy-, and diethoxy-isophthaloyl chlorides, and 2-methoxy-4-ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and dihalo isophthaloyl chlorides, such as dichloro-, dibromo-, difluoro-, or chlorobromo-, chlorofluoro-isophthaloyl chlorides are useful as are similar trihalo and tetrahalo isophthaloyl chlorides. The halogens in these compounds may be the same or different as in the case of the dihalo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides and nitro and lower carbalkoxy terephthaloyl chlorides.

In addition to the single ring diacid chlorides specified above, multiple ring diacid chlorides in which the acid chloride groups are oriented meta or para with respect to each other are also useful in this invention. Exemplary of such compounds are 4,4′-oxydibenzoyl chloride, 4,4′-sulfonyldibenzoyl chloride, 4,4′-dibenzoyl chloride, 3,3′-oxydibenzoyl chloride, 3,3′-sulfonyldibenzoyl chloride, and 3,3′-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diamines useful as reactants in forming the polyamide are compounds of the formulas $H_2N$—$Ar_1$—$NH_2$ and $R_1$—HN—$Ar_1$—NH—$R_1$ where $R_1$ is hydrogen or lower alkyl and $Ar_1$ is a divalent aromatic radical as defined above and the —$NH_2$ and —NHR groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine; N,N′-dimethylmetaphenylene diamine, N,N′-diethylmetaphenylene diamine, etc. There may be more than one alkyl group attached to the aromatic ring as in the case of dimethyl, trimethyl, tetramethyl, diethyl, triethyl, and triisopropyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4′-oxydiphenyldiamine, 4,4′-sulfonyldiphenyldiamine, 4,4′-diphenyldiamine, 3,3′-oxydiphenyldiamine, 3,3′-sulfonyldiphenyldiamine, and 3,3′-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring does not exceed nine.

The compositions of this invention will have the halocarbon resin and the polyamide uniformly dispersed through the polyimide material. The dispersed particles can be of any convenient size and shape and this aspect does not appear to be critical. Generally, no advantage is seen to exceed solid particle sizes of 800–1000 microns average diameter. Conveniently the halocarbon resin can be used in the form of a floc of 1/64 inch fibers or perhaps more usually in the form of a dispersion in which the particle size is about 10–500 microns average diameter. The preferred telomers will ordinarily be used in the form of particles generally below about 5 microns average. There is no critical lower limit on particle size and they of course can be used as small as they can be made.

In addition to the three essential components recited above, the novel compositions of this invention can optionally contain conventional bearing material additives for their intended purpose such as particles of graphite, bronze, molybdenum sulfide, etc. Addition of a small amount of an inorganic salt such as calcium chloride or lithium chloride provides enhanced results.

In the practice of this invention the useful compositions are prepared by first forming a composition containing at least one polyamide-acid of the aforementioned diamines and dianhydrides having in inherent viscosity of at least 0.1, preferably 0.3–5.0, having blended therein the particles of the halocarbon resin and the polyamide; then shaping the particle-containing polyamide-acid composition into a structure; and, thereafter, converting the structure to a polyimide structure containing the particles.

The process may be divided into four steps:
(1) Preparing the polyamide-acid.
(2) Preparing a composition of the particle/polyamide-acid mixture.
(3) Shaping the composition into a useful structure.
(4) Converting the structure to a particle-containing polyimide structure.

Each of these steps will be discussed separately in subsequent portions of this specification.

*Preparing polyamide-acid compositions*

The process for preparing the polyamide-acid composition involves reacting at least one organic diamine having the structural formula $H_2N-R'-NH_2$ as defined above with at least one tetracarboxylic acid dianhydride as defined above, in an organic solvent for at least one of the reactants, the solvent being inert to the reactants, preferably under anhydrous conditions, for a time and at a temperature sufficient to provide a shapeable composition of polyamide-acid.

It should be understood that it is not necessary that the polymeric component of the composition be composed entirely of the polyamide-acid. This is particularly true since conversion to the polyimide is contemplated subsequent to shaping the composition. To retain its shapeability, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups.

The normally liquid organic solvents of the N,N-dialkylcarboxylamide class are particularly useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with other solvents such as benzene, benzonitrile, dioxane, xylene, toluene and cyclohexane.

*Preparing a composition of the particle polyamide-acid mixture*

The halocarbon resin particles and the polyamide particles can be added at any stage in the preparation of the polyamide-acid, in the proportions given above. The particles can be added to the organic solvent prior even to the introduction of the diamine and the dianhydride. They also can be added to the solution in the organic solvent of one or both of the reactants before, during or after the formation of the polyamide-acid. Preferably, the particles are added to a solution of the polyamide-acid.

*Shaping the composition into a useful structure*

The polyamide-acid composition containing the particles dispersed therein is next shaped into a useful article. Shaping may be accomplished by extruding the solution through an appropriate orifice or slot to form filaments, rods, flat sheets, tubing or the like. Alternatively, the composition may be cast onto flat or curved surfaces to form sheets, films, etc., or placed in molds of the desired shape. The composition may also be coated onto substrates, preferably surface-modified polyimide films.

*Converting the structure or article to a particle-containing polyimide article*

The shaped articles composed of the polyamide-acid and the halocarbon and polyamide particles are converted to the respective polyimide shaped articles by any one or more of several processes. One process comprises converting the polyamide-acid units of the following structural formula:

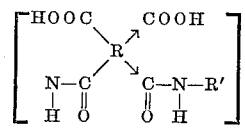

wherein the arrows denote isomerism, to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300–500° C. for a short interval (15 seconds to 2 minutes), improvements in the thermal and hydrolytic stabilities of the polyimide structure are obtained as well as an increase in inherent viscosity.

A second process for converting polyamide-acid to the corresponding polyimide is a chemical treatment and involves treating the polyamide-acid composition with a dehydrating agent alone or in combination with a tertiary amine, e.g. acetic anhydride or an acetic anhydride-pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. The amine functions as a catalyst for the action of the cyclizing agent, the anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids (ref. Bernthsen-Sudborough, Textbook of Organic Chemistry, Van Nostrand, 1935, p. 861 and Hackh's Chemical Dictionary, Blakiston, 1953, p. 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratic acid, trimethoxy benzoic acid; alpha- and beta-naphthoic acids; and biphenyl-carboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2-4-lutidine, 2,6-lutidine and 2,4,6-collidine, and are generally used in larger amounts.

As a third process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step can be limited if it is desired to shape the composition at this stage. After shaping, the completion of the cyclization of the polyimide/polyamide-acid may be accomplished.

The presence of polyimide is evidenced by its insolubility in cold basic reagents as opposed to the rapid solubility of polyamide-acid. Its presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

The bearing materials of this invention are unaffected by exposure to virtually any solvent or corrosive chemical except aqueous alkaline hydroxides and acids. They can withstand exposure at temperatures of 300° C. and higher. They have low starting friction, which is important in some bearing applications and often results in considerable cost savings. In contrast to metal bearings, the coefficient of friction decreases with increase in load and, at high loads, with increase in temperature. Also in contrast to metal bearings, friction drops with reduction of speed. This is very important under some high load/low speed conditions.

The low thermal conductivity of the materials of this invention makes it preferable to fabricate them as thin as practical, in order to promote heat transfer. This permits more compact design and reduced cost.

The excellent thermal and wear resistance of these polyimide materials is particularly important when the bearing is to be confined in a rigid housing with very little clearance. The combined effect of generated heat and of the pressure from thermal expansion can become very severe. The filled compositions of this invention are unaltered by moisture, and so do not deteriorate or change dimensions with variations in moisture. Finally they serve well under non-lubricated conditions. Their PV limits are higher than those of the best known polymeric non-lubricated bearings.

The properties of the filled compositions of this invention make them useful in the following situations:

(1) With non-lubricating liquids such as gasoline and industrial solvents.

(2) With many corrosive substances.

(3) At elevated temperatures (to 500° F. or higher) where common lubricants degrade or vaporize.

(4) In low-humidity service where other types of dry bearings cannot be used.

(5) At high-humidity locations where there is a tendency for environmental attack.

(6) For heavy-load, slow-speed duty that tends to squeeze oil out of ordinary bearing surfaces.

(7) In areas where there is danger of fretting.

(8) For lubricated applications in which wear may occur immediately after each start from rest.

(9) In applications where slip-stick motion is harmful, or where it is the cause of undesirable vibration and noise.

(10) When lowest possible static friction is desirable—e.g. reciprocating or oscillating systems.

(11) In locales that are inaccessible or liable to be overlooked during lubrication.

(12) In applications where weight savings are essential.

(13) In areas where the use of oil would attract abrasive dust.

(14) Where lack of lubrication might result in costly interruption of production, or extensive damage to equipment.

Good abrasion-resistance makes these materials useful for conveyors and industrial belts. They also can be used for release sheets where anti-stick properties are important.

Tenacity as used herein is based upon the cross-sectional area of the film being measured and is determined by elongating a film sample at a rate of 5% per minute or less until the film sample breaks.

Elongation is the percent increase in length at the break of the film in the preceding test.

Modulus is a measure of film stiffness, that is, the higher the modulus the greater the stiffness, and the modulus is the slope of the initial portion of the stress/strain curve at 1% elongation, the film being elongated at a rate of 5%/minute or less.

K value is a measure of resistance to wear. The test and calculations for determination of K values are described by J. P. O'Rourke, R. B. Lewis and W. D. Lewis, Am. Soc. Mech. Eng. J., paper number 60–WA–334 (1961).

The invention will be more clearly understood by referring to the examples which follow. These examples, which illustrate specific embodiments of the present invention, should not be construed to limit the invention in any way.

*Example 1*

To a 15% by weight solution of the polyamide-acid of pyromellitic dianhydride and 4,4'-diaminodiphenyl ether in N,N-dimethylacetamide was added the following:

(1) A telomer of tetrafluoroethylene and methylcyclohexane having a number average molecular weight of 3,500, a crystalline melting point of 298° C. and containing approximately 1.1% by weight chlorine and 0.4% by weight hydrogen. The telomer had been prepared by reacting tetrafluoroethylene with methylcyclohexane in the presence of di-tert-butyl peroxide in trichlorotrifluoroethane solvent, as described in Example 1 of the Brady, U.S. Patent No. 3,067,262, referred to above, and (2) A 20% by weight solution of poly(m-phenylene isophthalamide) in N,N-dimethylacetamide.

The amounts of the three components were such that the polymer content of the solution was 69% by weight polyamide-acid, 29% by weight telomer and 2% by weight polyamide. The solution was cast into a film which was heated at 300° C. to dry it and convert the polyamide-acid to polyimide. The K value of this film, obtained from thrust washer tests at PV=20,000 (pressure: 29.9 p.s.i. and velocity: 670 feet/minute) was 6, compared to about 18 for a 70:30 polyimide:telomer control film.

When the polyamide content was increased to 4, 7 and 9%, the amounts of polyimide and telomer being the same in relation to each other, the K values were 3, 5 and 9, respectively.

Three-mil films of Example 1 compositions of this invention had tenacities of about 8,000–12,000 p.s.i., elongations of about 6–20% and moduli of about 270,000–330,000 p.s.i., compared to 12,000–13,000 p.s.i., 35–45% and 265,000–270,000 p.s.i., respectively, for the control.

*Example 2*

Example 1 was repeated except using the components in an amount of 67% by weight polyamide-acid, 28% by weight telomer and 5% polyamide. Samples of the resulting film were annealed at 400° C. for reduction of brittleness and, for the indicated annealing times, had the following properties:

|  | Time of annealing in minutes | | | | |
|---|---|---|---|---|---|
|  | 0 | 1 | 2 | 3 | 5 | 10 |
| Tenacity (in thousands, pounds/sq. in.) | 9.9 | 5.5 | 7.1 | 7.0 | 10.3 | 11.4 |
| Elongation (percent) | 8.0 | 3.0 | 5.0 | 7.0 | 13 | 29 |
| Modulus (in thousands, pounds/sq. in.) | 318 | 283 | 271 | 259 | 267 | 232 |

*Example 3*

To 67 grams of a 15% by weight solution of the polyamide-acid of pyromellitic dianhydride and 4,4'-diaminodiphenyl ether in N,N-dimethylacetamide was added 35 grams of a low molecular weight polytetrafluoroethylene telomer, prepared according to the procedures of Example 1 of the above-mentioned Brady patent, in which the telogen was trichlorotrifluoroethane, in dimethylacetamide at a solids content of 12% by weight. Next, 0.75 gram of poly(hexamethylene adipamide) was added in the form of a fine powder (less than 100 mesh). After mixing at room temperature, 9.5 cc. of acetic anhydride and 2.9 cc. of isoquinoline were added and mixed uniformly with the mass. The resulting mixture was pressed between sheets of "Teflon" FEP fluorocarbon film (Du Pont registered trademark) at 100° C. and 500–800 p.s.i. pressure for one minute to yield a gel film which was dried at 250° C. for 30 minutes. The K value for this film was about 10.

*Example 4*

Metered streams of the polyamide-acid solution of Example 1, acetic anhydride and isoquinoline were mixed in a mole ratio of 1:4:0.5 in a refrigerant-jacketed pipe line mixer. Additional streams of a 12% by weight of halocarbon telomer (same as in Example 3) in dimethylacetamide and a 15% by weight solution in dimethylacetamide of the polyamide used in Example 1 (containing 3.5% by weight calcium chloride and 1% by weight ammonium chloride) were joined into the pipe line mixing. The ratio of the polyamide-acid, halocarbon telomer and polyamide streams was kept at 60:37.4:10 by weight, corresponding to a ratio of polyimide:telomer:polyamide of 60:30:10 by weight. The temperature of the mixture was held at −20° C. during mixing and transport to a die from which the mixture was extruded directly onto a casting belt heated at 100° C. The gel film was stripped from the belt and dried under restraint in an oven at 430° C. The resulting 3 mil polyimide film had a tenacity of 12,400 p.s.i. in the machine direction and 13,700 p.s.i. in the transverse direction; an elongation of 35% in the machine direction and 36% in the transverse direction; a modulus of 331,000 in the machine direction and 364,000 in the transverse direction; and K values of 4–9.

In addition to the above specific examples, corresponding improvements in K value can be obtained and the practice of this invention repeated by using the procedure of, for example, Example 1 above, substituting other components for those of such example. By way of illustration, in place of the polyamide-acid of Example 1 there can be substituted, with excellent results, the polypyromellitamide-acid of m-phenylenediamine, the copolypyromellitamide-acid of bis(4-aminophenyl) ether and m-phenylenediamine (1:1), as well as others within the scope of the appended claims. Similarly, substitution of other halocarbons and polyamides can readily be made with similar satisfactory results by persons skilled in this art in accordance with the teachings herein.

I claim:

1. A composition of matter comprising, as three essential components,
   (1) 60–87.5 parts by weight of a polyamide-acid of a diamine of the formula $H_2N-R'-NH_2$ where R' is arylene and a tetracarboxylic acid dianhydride of the formula

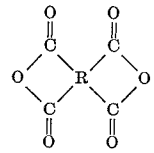

where R is a tetravalent organic radical;
   (2) 20–40 parts by weight of a halocarbon resin having the recurring unit

where X is selected from the group consisting of chlorine and fluorine; and
   (3) 1–15 parts by weight of a polyamide selected from the group consisting of
      (a) linear condensation polyamides of an aliphatic dibasic acid of 4–18 carbons and an alkylene diamine of 2–10 carbons; and
      (b) aromatic polyamides having the recurring structural unit

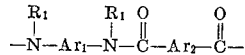

wherein $R_1$ is selected from the group consisting of hydrogen and alkyl of 1–4 carbons and wherein $Ar_1$ and $Ar_2$ are each a divalent aromatic radical, the chain-extending bonds of each of these divalent aromatic radicals being other than ortho to one another.

2. The composition as set forth in claim 1 in the form of a self-supporting film.

3. A film as in claim 2 wherein said polyamide-acid is a polyamide acid of pyromellitic dianhydride and 4,4'-diaminodiphenyl ether.

4. The composition as set forth in claim 1 wherein R' is selected from the group consisting of arylene radicals in meta-phenylenediamine, para-phenylene-diamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, wherein R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4-dicarboxyphenyl)sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride, and wherein said halocarbon resin is selected from the group consisting of homopolymers of tetrafluoroethylene and chlorotrifluoroethylene, copolymers of tetrafluoroethylene with hexafluoropropylene, and telomers thereof with active telogens selected from the group consisting of methanol, methylcyclohexane, chloroform, carbon tetrachloride and trichlorotrifluoroethane.

5. The process which comprises mixing at least one diamine of the formula $H_2N-R'-NH_2$ wherein R' is arylene with at least one tetracarboxylic acid dianhydride, in a solvent for at least one of said diamine and said dianhydride under conditions to form a polyamide-acid; admixing with 60–87.5 parts by weight of said polyamide-acid from 20–40 parts by weight of a halocarbon resin having the recurring unit

wherein X is selected from the group consisting of chlorine and fluorine; also admixing therewith from 1–15 parts by weight of a polyamide selected from the group consisting of (a) linear condensation polyamides of an aliphatic dibasic acid of 4–18 carbons and an alkylene diamine of 2–10 carbons; and (b) aromatic polyamides having the recurring structural unit

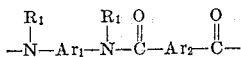

wherein $R_1$ is selected from the group consisting of hydrogen and alkyl of 1–4 carbons and wherein $Ar_1$ and $Ar_2$ are each a divalent aromatic radical, the chain-extending bonds of each of these divalent aromatic radicals being other than ortho to one another; and subsequently forming a shaped article therefrom.

6. The process of claim 5 wherein said diamine is 4,4'-diaminodiphenyl ether, said dianhydride is pyromellitic dianhydride, and said solvent is dimethylacetamide.

7. The process of claim 5 wherein the polyamide-acid in said shaped article is converted to polyimide by heating said article.

8. The process of claim 5 wherein the polyamide-acid in said shaped article is converted to polyimide by treating said article with an anhydride selected from the group consisting of lower fatty acid anhydrides and aromatic monobasic acid anhydrides.

9. The process of claim 5 wherein the polymer in said article is converted to polyimide by treating said article with a mixture of acetic anhydride and pyridine.

10. A composition of matter comprising, as three essential components, (1) 55–80 parts by weight of a polyimide of a polyamide-acid having recurring units of the formula

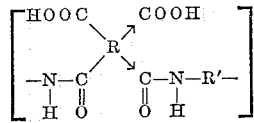

wherein the arrows denote isomerism, and wherein R is a tetravalent organic radical and R' is arylene; and, dispersed in said polyimide (2) 20–40 parts by weight of a halocarbon resin having the recurring unit

where X is selected from the group consisting of chlorine and fluorine; and (3) 1–15 parts by weight of a polyamide selected from the group consisting of (a) linear condensation polyamides of an aliphatic dibasic acid of 4–18 carbons and an alkylene diamine of 2–10 carbons; and (b) aromatic polyamides having the recurring structural unit

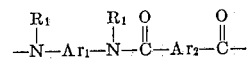

wherein $R_1$ is selected from the group consisting of hydrogen and alkyl of 1–4 carbons and wherein $Ar_1$ and $Ar_2$ are each a divalent aromatic radical, the chain-extending bonds of each of these divalent aromatic radicals being other than ortho to one another.

11. The composition as set forth in claim 10 in the form of a self-supporting film.

12. A film as in claim 11 wherein said polyamide-acid is a polyamide-acid of pyromellitic dianhydride and 4,4'-diaminodiphenyl ether.

13. The compositions as set forth in claim 10 wherein R' is selected from the group consisting of arylene radicals in meta-phenylenediamine, para-phenylenediamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, wherein R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4 - dicarboxyphenyl)sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride and wherein said halocarbon resin is selected from the group consisting of homopolymers of tetrafluoroethylene and chlorotrifluoroethylene, copolymers of tetrafluoroethylene with hexafluoropropylene, and telomers thereof with active telogens.

References Cited

UNITED STATES PATENTS 2,944,993  7/1960  Brebner et al. ———— 260—78
3,005,795  10/1961  Busse et al. ———— 260—78

FOREIGN PATENTS 903,271  8/1962  Great Britain.

GEORGE F. LESMES, *Primary Examiner.*

MURRAY TILLMAN, *Examiner.*

PAUL LIEBERMAN, *Assistant Examiner.*